(12) United States Patent
Li et al.

(10) Patent No.: US 10,983,337 B2
(45) Date of Patent: Apr. 20, 2021

(54) ADJUSTMENT STRUCTURE FOR DEPTH OF FIELD, DISPLAY DEVICE AND CONTROL METHOD THEREOF

(71) Applicants: Beijing BOE Display Technology Co., Ltd., Beijing (CN); BOE TECHNOLOGY GROUP CO., LTD., Beijing (CN)

(72) Inventors: Xiaohu Li, Beijing (CN); Minghui Zhang, Beijing (CN); Inho Park, Beijing (CN); Hui Zheng, Beijing (CN); Xiaopeng Cui, Beijing (CN)

(73) Assignees: BEIJING BOE DISPLAY TECHNOLOGY CO., LTD., Beijing (CN); BOE TECHNOLOGY GROUP CO., LTD., Beijing (CN)

(\*) Notice: Subject to any disclaimer, the term of this patent is extended or adjusted under 35 U.S.C. 154(b) by 0 days.

(21) Appl. No.: 16/589,266

(22) Filed: Oct. 1, 2019

(65) Prior Publication Data
US 2020/0233211 A1 Jul. 23, 2020

(30) Foreign Application Priority Data
Jan. 17, 2019 (CN) .......................... 201910044502.7

(51) Int. Cl.
*G02B 27/00* (2006.01)
*G02B 27/09* (2006.01)
*G02B 26/00* (2006.01)
*G02B 27/01* (2006.01)
*G02B 7/04* (2021.01)

(52) U.S. Cl.
CPC .......... *G02B 27/0075* (2013.01); *G02B 7/04* (2013.01); *G02B 27/0961* (2013.01); *G02B 2027/0187* (2013.01)

(58) Field of Classification Search
None
See application file for complete search history.

(56) References Cited

U.S. PATENT DOCUMENTS

2010/0013791 A1\* 1/2010 Haga ....................... G06F 3/042
345/174

\* cited by examiner

*Primary Examiner* — Mark T Monk
(74) *Attorney, Agent, or Firm* — Calfee, Halter & Griswold LLP

(57) ABSTRACT

An adjustment structure for depth of field, a display device, and a control method thereof. The adjustment structure for depth of field includes: a first substrate, a second substrate and a lens layer located between the first substrate and the second substrate. The lens layer includes a plurality of lens units; each of the plurality of lens units includes two electrodes and a lens located between the two electrodes with an adjustable focal length; the lens includes charged particles and a first transparent insulating liquid encapsulated by a transparent flexible film; the charged particles include positively charged particles and negatively charged particles.

20 Claims, 6 Drawing Sheets

ADJUSTMENT STRUCTURE FOR DEPTH OF FIELD, DISPLAY DEVICE AND CONTROL METHOD THEREOF

RELATED APPLICATION

The present application claims the benefit of priority from the Chinese patent application No. 201910044502.7 filed on Jan. 17, 2019, the disclosure of which is incorporated herein by reference.

TECHNICAL FIELD

This disclosure relates to the field of display technologies, and specifically to an adjustment structure for depth of field, a display device, and a control method thereof.

BACKGROUND ART

With the development of virtual reality technology and equipment, virtual reality imaging technology is being introduced into more and more entertainment facilities. Portable devices such as a virtual reality display helmet and glasses are also evolving and spreading rapidly. A common approach of three-dimensional display in an existing virtual reality display device is to display images of one and the same object at left and right eye angles respectively. Therefore, a stereo visual sense is produced in the brain upon receipt of pictures of the same object from different angles by both eyes. However, the existing display device still needs to be improved.

SUMMARY

In an exemplary embodiment, this disclosure provides an adjustment structure for depth of field. The adjustment structure for depth of field includes: a first substrate, a second substrate, and a lens layer located between the first substrate and the second substrate; the lens layer includes a plurality of lens units; each of the plurality of lens units includes two electrodes and a lens located between the two electrodes with an adjustable focal length; the lens includes charged particles and a first transparent insulating liquid encapsulated by a transparent flexible film; the charged particles include positively charged particles and negatively charged particles.

According to an exemplary embodiment, the charged particles have a density not greater than that of the first transparent insulating liquid.

According to an exemplary embodiment, each of the two electrodes includes a surface facing the other electrode, the surface being perpendicular to the first substrate and the second substrate.

According to an exemplary embodiment, each of the two electrodes includes a surface facing the other electrode, the surface being parallel with the first substrate and the second substrate.

According to an exemplary embodiment, the lens unit further includes: an insulating baffle, the insulating baffle being perpendicular to the first substrate and the second substrate, the insulating baffle and the two electrodes defining a receiving space; and a second transparent insulating liquid, the second transparent insulating liquid being filled in the receiving space, and the lens being located in the second transparent insulating liquid.

According to an exemplary embodiment, the first transparent insulating liquid has a refractive index greater than that of the second transparent insulating liquid.

According to an exemplary embodiment, the lens unit further includes: a light-shielding layer, the light-shielding layer being located on the first substrate and the second substrate, an orthogonal projection of the light-shielding layer on the substrates at least covering an orthogonal projection of the electrodes and the insulating baffle on the substrates.

According to an exemplary embodiment, the plurality of lens units are arranged in an array, and two of the lens units immediately adjacent to each other share an electrode.

According to an exemplary embodiment, the plurality of lens units are arranged in an array; one of the first substrate and the second substrate is provided with switching lines arranged in rows and data lines arranged in columns; the electrodes are distributed in a direction in which the data lines extend and are connected with the data lines, and the insulating baffles are distributed in a direction in which the switching lines extend.

According to an exemplary embodiment, the lens is configured to be deformable in an electric field, and an orthogonal projection of the light-shielding layer on the first substrate covers an orthogonal projection of the charged particles on the first substrate.

According to an exemplary embodiment, the charged particles have a dimension of 0.05-40 µm, and the charge particles include at least one of electrophoretic particle and electronic ink.

According to an exemplary embodiment, a display device includes: a display panel, a control unit for depth of field and the adjustment structure for depth of field as mentioned in the above embodiments; the adjustment structure for depth of field is located on a light exit side of the display panel, and the plurality of lens units correspond to a plurality of pixel regions of the display panel one-to-one; the control unit for depth of field is connected with the display panel and the adjustment structure for depth of field respectively.

According to an exemplary embodiment, the display device further includes: a displacement sensor, the displacement sensor being connected with the control unit for depth of field.

According to an exemplary embodiment, the charged particles have a density not greater than that of the first transparent insulating liquid.

According to an exemplary embodiment, each of the two electrodes includes a surface facing the other electrode, the surface being perpendicular to the first substrate and the second substrate.

According to an exemplary embodiment, each of the two electrodes includes a surface facing the other electrode, the surface being parallel with the first substrate and the second substrate.

According to an exemplary embodiment, the lens unit further includes: an insulating baffle, the insulating baffle being perpendicular to the first substrate and the second substrate, the insulating baffle and the two electrodes defining a receiving space; and a second transparent insulating liquid, the second transparent insulating liquid being filled in the receiving space, and the lens being located in the second transparent insulating liquid.

According to an exemplary embodiment, the first transparent insulating liquid has a refractive index greater than that of the second transparent insulating liquid.

In yet another exemplary embodiment, a control method of a display device is provided. The display device includes a display panel, a control unit for depth of field and the adjustment structure for depth of field according to the above-mentioned embodiments. The adjustment structure for depth of field is located on a light exit side of the display panel, and the plurality of lens units correspond to a plurality of pixel regions of the display panel one-to-one; the control unit for depth of field is connected with the display panel and the adjustment structure for depth of field respectively. The control method includes: adjusting a corresponding adjustment structure for depth of field based on depth of field information of each pixel region.

According to an exemplary embodiment, adjusting the corresponding adjustment structure for depth of field based on depth of field information of each pixel region includes: based on depth of field information of each pixel region, determining a diopter corresponding to the pixel region; and based on the diopter, determining a voltage applied to the two electrodes of the corresponding adjustment structure for depth of field such that the lens of the corresponding adjustment structure for depth of field is deformed.

BRIEF DESCRIPTION OF DRAWINGS

In order to illustrate the technical solutions in the embodiments of this disclosure or in the prior art more clearly, drawings to be used in depictions of the embodiments or the prior art will be briefly introduced below. Apparently, the drawings in the depictions below are only some exemplary embodiments. For a person having ordinary skills in the art, other drawings can be further obtained from these drawings without any inventive efforts.

DETAILED DESCRIPTION

Figure 1A:
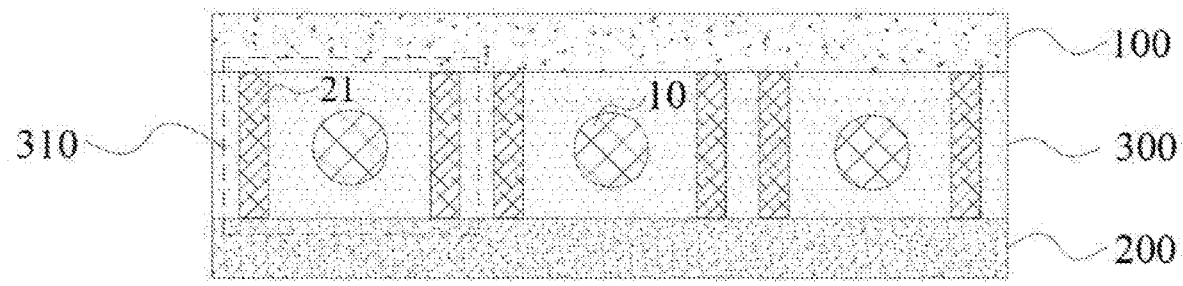
FIG. 1(a) is a schematic structure view of an adjustment structure for depth of field according to an exemplary embodiment.

The technical solutions in the exemplary embodiments of this disclosure will be described clearly and completely with reference to the drawings. Obviously, the described exemplary embodiments are only part of the embodiments of this disclosure, instead of all. Based on the exemplary embodiments provided in this disclosure, all other embodiments obtainable for a person having ordinary skills in the art without any inventive efforts shall fall within the protection scope of this disclosure.

This disclosure is made by the inventor based on findings and knowledge of the following facts and problems. Existing virtual reality display devices will make a user feel dizzy after being worn for an extended period of time. After intensive research and extensive experimentation, the inventor has found that this is mainly because that the picture displayed by the existing virtual reality display device lacks depth information corresponding to the stereo image. As mentioned above, the three-dimensional display of the existing virtual reality display device is realized by displaying images of the left and right eyes respectively on the left and right screens, and producing a three-dimensional sense in the brain upon receipt of the information with differences by the human eyes. In other words, light rays emitted from an existing virtual reality display device have no depth information, and the focus of the eyes is fixed at a fixed value, and during the use of the virtual reality display device, the focus adjustment of the human eyes does not match with the sense of depth of the stereo image, which will lead to convergence conflict and in turn cause dizziness after extended periods of watching existing virtual display devices.

An exemplary embodiment provides an adjustment structure for depth of field. According to an exemplary embodiment, with reference to FIG. 1(a) and FIG. 1(b), the adjustment structure for depth of field includes: a first substrate 100, a second substrate 200 and a lens layer 300. The lens layer 300 is located between the first substrate 100 and the second substrate 200. The lens layer 300 includes a plurality of lens units 310 (as indicated by the dashed blocks in FIG. 1(a)), and each lens unit 310 includes two electrodes 21 and a lens 10 located between the two electrodes 21 with an adjustable focal length. The lens 10 includes charged particles 12 and a first transparent insulating liquid 13 encapsulated by a transparent flexible film 11; the charged particles 12 include positively charged particles and negatively charged particles (as shown in FIG. 1(b)).

Therefore, a display device using the adjustment structure for depth of field can realize the depth of field of a three-dimensional display image such that the user can visually feel a true sense of depth while receiving the distance information of the display picture. Moreover, upon needs of the picture, the adjustment structure for depth of field can be used to adjust the depth of field of each object in the picture in real time so as to enhance the three-dimensional display effect, avoid convergence conflict of the user and prevent dizziness of the user during extended periods of use.

According to an exemplary embodiment, a focal length of light rays emitted from the pixel region into the adjustment structure for depth of field may be adjusted by means of the adjustment structure for depth of field such that depth of field information of multiple pixel points can be presented via the adjustment structure for depth of field. In particular, when the display picture is a stereo figure, i.e., a 3D picture (e.g., a picture displayed with a display device), focuses of different positions in the picture are not in a same plane. Now, with the adjustment structure for depth of field, the focus depths of different positions in the picture are adjusted to be different such that the depth of field of the display picture is realized and the stereo sense is more real. Therefore, when the user uses the display device, the focus adjustment of the human eyes matches with the sense of depth of the stereo image, which enhances the three-dimensional effect, increases the user's sense of immersion and improves the use experience of the user. According to an exemplary embodiment, the display device using the adjustment structure for depth of field may be a virtual reality display device, or a naked eye stereoscopic display device.

The components of the adjustment structure for depth of field will be illustrated below in detail according to specific exemplary embodiments. According to an exemplary embodiment, when the adjustment structure for depth of field is applied in a display device, lens units 310 in the adjustment structure for depth of field may correspond to pixel regions in the display device one-to-one, thereby adjusting the focal length of light rays emitted from each pixel region. Alternatively, one lens unit 310 in the adjustment structure for depth of field may also correspond to multiple pixel regions having the same field of depth in the display device, thereby adjusting the focal length of light rays emitted from the pixel regions. According to an exemplary embodiment, the pixel region may include one or more pixel points.

According to an exemplary embodiment, both the first substrate 100 and the second substrate 200 may be made of a transparent material, which can ensure that light rays can enter the adjustment structure for depth of field, thereby realizing the use of the adjustment structure for depth of field. Specifically, both the first substrate 100 and the second substrate 200 may be made of glass.

According to an exemplary embodiment, the lens unit 310 has a lens 10 with an adjustable focal length, so the focal length of light rays entering the adjustment structure for depth of field can be adjusted via the lens, thereby presenting the depth of field information of the pixel points.

According to an exemplary embodiment, the lens 10 includes charged particles 12 and a first transparent insulating liquid 13 encapsulated by a transparent flexible film 11. The charged particles 12 include positively charged particles and negatively charged particles. Therefore, when a voltage is applied to the electrodes in the lens units, the charged particles will move under the effect of the electric field, and then the movement of the charged particles can be used to change the shape of the lens so as to change the curvature of the lens, thereby changing the focal length of the lens.

According to an exemplary embodiment, the charged particles 12 have a density not greater than that of the first transparent insulating liquid 13. In this way, it can ensured that the charged particles suspend in the first transparent insulating liquid, so when a voltage is applied to the electrodes in the lens units, attracted by the electrodes, the charge particles tend to move towards the electrodes, thereby facilitating deformation of the lens.

The transparency of the charged particles is not particularly limited, and the charged particles can be transparent or non-transparent, which can be designed by those skilled in the art upon specific situations. For example, according to an exemplary embodiment, the charged particles 12 may include at least one of electrophoretic particle and electronic ink. Accordingly, adjustment of the focal length of the lens can be realized by using the charged particles mentioned above. The electrophoretic particles may be charged particles synthesized from a host material of a polymer such as polystyrene or polyethylene, or the electrophoretic particles may also be charged particles composed of a host material of titanium dioxide, sunset yellow or the like.

Figure 1B:
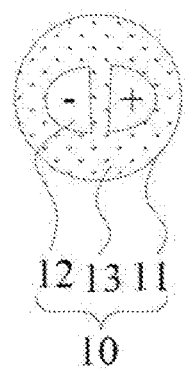
FIG. 1(b) is a schematic structure view of a lens according to an exemplary embodiment.

According to an exemplary embodiment, as shown in FIG. 1(a), each of the two electrodes 21 includes a surface facing the other electrode, the surface being perpendicular to the first substrate 100 and the second substrate 200.

Figure 10:
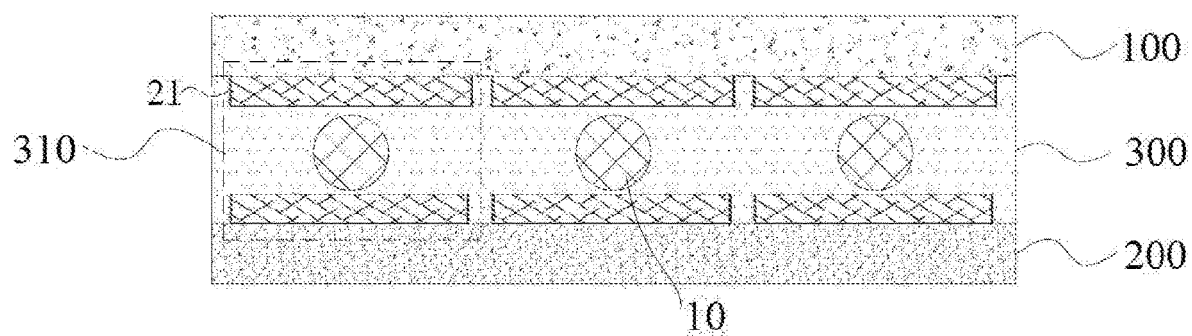
FIG. 10 is a schematic structure view of the adjustment structure for depth of field according to an exemplary embodiment.

Similarly, according to an exemplary embodiment, as shown in FIG. 10, each of the two electrodes 21 includes a surface facing the other electrode, the surface being parallel to the first substrate 100 and the second substrate 200.

According to an exemplary embodiment, the charged particles 12 may have a dimension of 0.05-40 μm, and the dimensions of the electrophoretic particles and the electronic ink both fall within the above range. In this way, the adjustment structure for depth of field is adapted to be used in a display device without affecting the dimension of the lens unit. Specifically, the charged particles 12 may have a dimension of 1 μm, 5 μm, 10 μm, 20 μm and 30 μm.

According to an exemplary embodiment, the number of the charged particles 12 may be set based on the specific dimension of the charged particles 12 as long as the adjustment of the focal length of the lens can be realized through control of the distribution of the charged particles. For example, when the charged particles have a large dimension, a relatively small number of charged particles can be arranged in the lens unit. When the charged particles have a small dimension, a relatively large number of charged particles can be arranged in the lens unit.

According to an exemplary embodiment, the transparent flexible film 11 may include at least one of a polyimide film, a polyester film, and a polyolefin film. Therefore, the lens has good flexibility and transmittance. When the charged particles move, the lens can be deformed by taking advantage of the flexibility of the transparent flexible film, thereby changing the curvature of the lens and thus changing the focal length of the lens. According to an embodiment of this disclosure, the transparent flexible film 11 has a homogeneous thickness, so when passing through the transparent flexible film, light rays will only shift in parallel, but will not change the direction in which they travel.

According to an exemplary embodiment, the first transparent insulating liquid 13 may be a non-polar liquid or a liquid insulating medium. The non-polar liquid may have a refractive index in the range of 1-3. Specifically, the non-polar liquid may be dimethicone. The liquid insulating medium may be at least one of a non-polar alkane, a cycloalkane, an aromatic hydrocarbon, tetrachloroethylene, and tetrachloromethane, which have a density close to that of the charged particles. Therefore, on one hand, the charged particles can move in the above liquid; on the other hand, insulation between the positively charged particles and the negatively charged particles can be ensured.

According to an exemplary embodiment, the lens 10 may be a large-sized electrophoresis pellet or an electronic ink microcapsule, and the lens 10 may be fabricated separately and then placed in the lens unit 310. The fabrication of the lens 10 may be similar to that of the microcapsule of electronic paper or the electrophoresis pellet. Thereby, the lens may be obtained by using a conventional method without introducing new equipment or processes, which saves the production costs.

According to an exemplary embodiment, the lens unit 310 is provided with two electrodes 21. The material of the electrodes is not particularly limited as long as it has good electrical conductivity, so those skilled in the art can make a choice upon specific situations. For example, the material of the electrodes 21 may be a transparent conductive material according to an embodiment of this disclosure. Specifically, the material of the electrodes 21 may be indium tin oxide. The material of the electrodes 21 may further be a metal material, specifically Cu, Ag and so on.

According to an exemplary embodiment, the electrodes may have a height of 0-50 μm. That is, the lens units 310 may have a height of 0-50 μm. Thereby, an adjustment structure for depth of field adapted for being used in a display device can be obtained.

Figure 2:
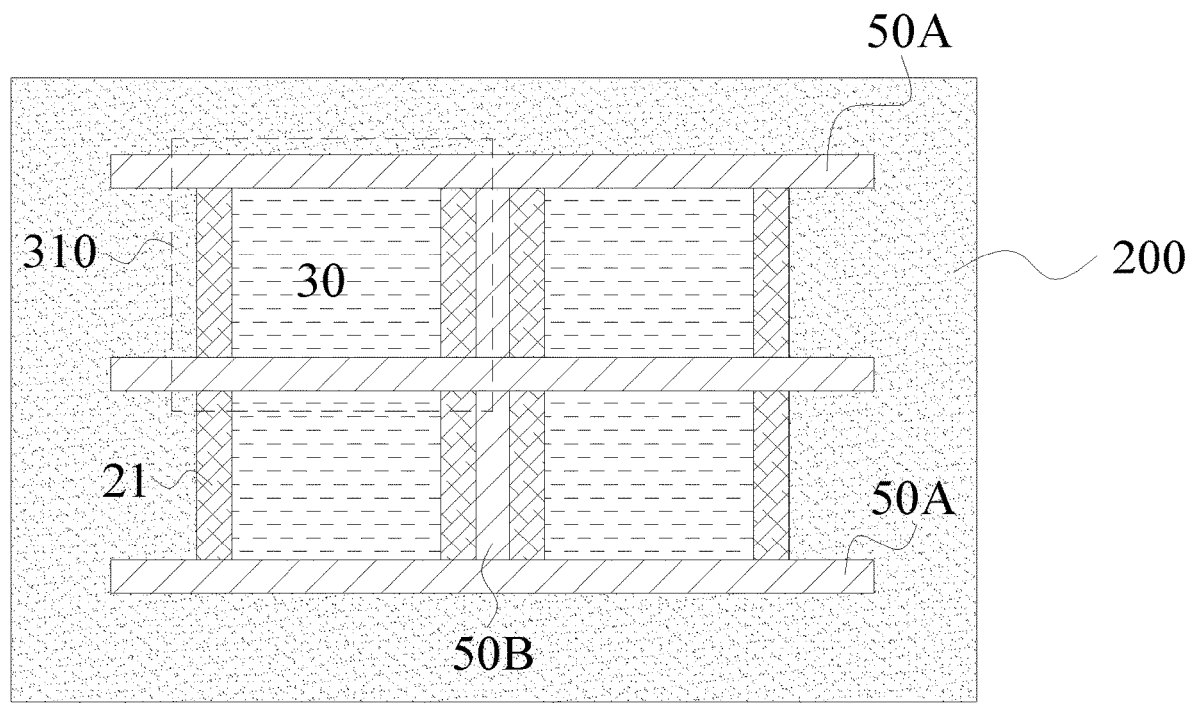
FIG. 2 is a top view of part of the adjustment structure for depth of field according to an exemplary embodiment.
Figure 3A:
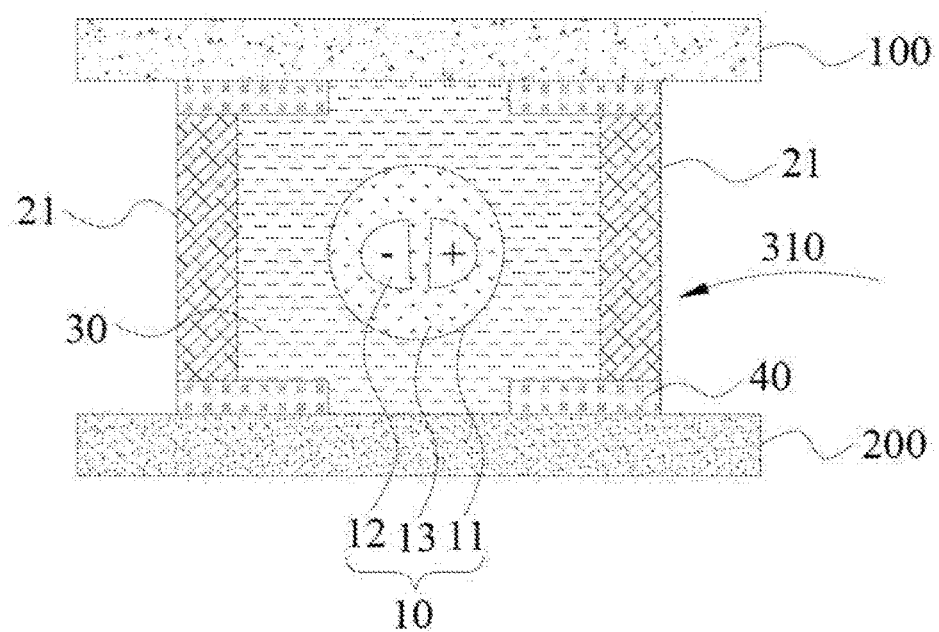
FIG. 3(a) is a schematic structure view of an adjustment structure for depth of field according to an exemplary embodiment.
Figure 3B:
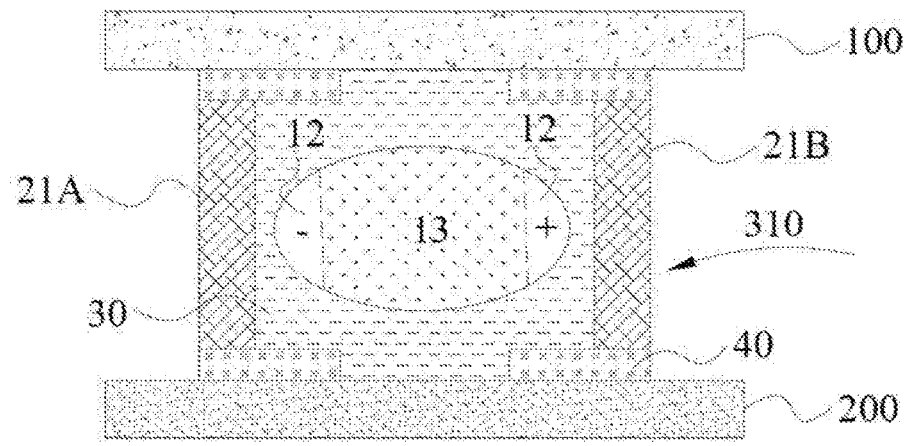
FIG. 3(b) is a schematic structure view of the adjustment structure for depth of field according to an exemplary embodiment.

According to an exemplary embodiment, with reference to FIG. 2, each lens unit 310 may further include insulating baffles 50A, 50B and a second transparent insulating liquid 30. The insulating baffles 50A, 50B are perpendicular to a first substrate (not shown) and a second substrate 200. The insulating baffle 50A and two electrodes 21 define a receiving space. The second transparent insulating liquid 30 is filled in the receiving space. The lens 10 is arranged in the second transparent insulating liquid 30 (as shown in FIG. 3(*a*)). Therefore, each lens unit forms a receiving space by the insulating baffle and two electrodes, in which the second transparent insulating liquid and the lens are filled, so that the use function of the lens units is realized, and the plurality of lens units do not interfere with each other. According to an embodiment of this disclosure, the lens units 310 may be arranged in an array, with an insulating baffle 50A located between two adjacent rows of the lens units 310, and optionally an insulating baffle 50B located between two adjacent columns of the lens units 310. In this way, the separation function of the insulating baffles in the row direction and the column direction of the lens units can be realized.

According to an exemplary embodiment, with reference to FIG. 3(*a*), the second transparent insulating liquid 30 is filled in a receiving space defined by two electrodes 21 and an insulating baffle (not shown), and the lens 10 is located in the second transparent insulating liquid 30. When no voltage is applied to the two electrodes 21, the positively charged particles and the negatively charged particles in the lens are concentrated in the middle area of the lens 10 due to the attraction therebetween, and the positively charged particles and the negatively charged particles are insulated from each other by the first transparent insulating liquid 13.

With reference to FIG. 3(*b*), when a voltage is applied to the two electrodes 21, the electrodes attract or repel the charged particles 12 in the lens 10, and an electric field is generated between the two electrodes 21. Under the effect of the electric field, the positively charged particles in the lens 10 move towards the negative electrode (indicated by 21B in the drawing) and the negatively charged particles in the lens 10 move towards the positive electrode (indicated by 21A in the drawing). In other words, the positively charged particles and the negatively charged particles in the lens 10 will respectively move towards the ends of the lens unit 310 where the electrodes are provided, which causes a change in the shape of the lens and in turn a change in the curvature of the lens. Therefore, the focal length of the lens is changed.

Figure 4:
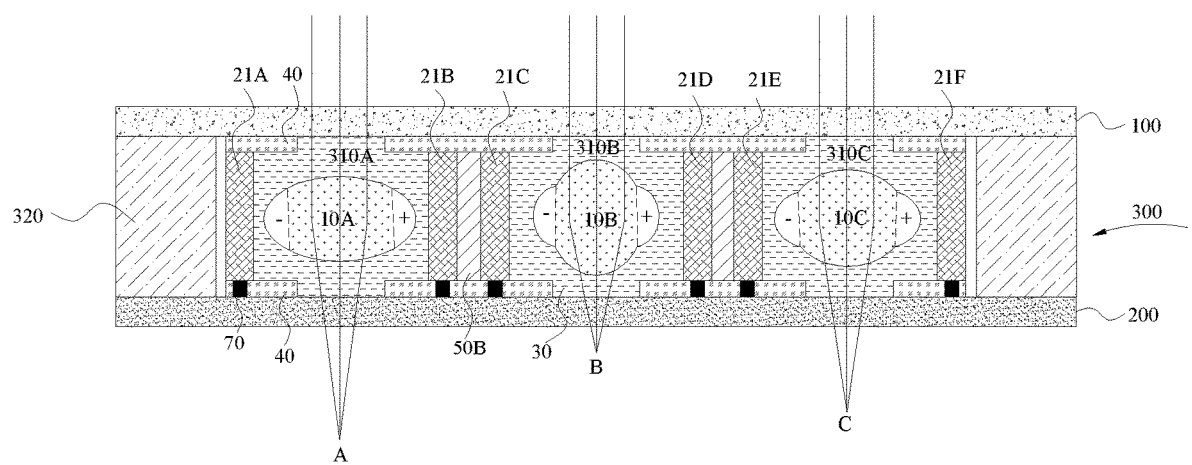
FIG. 4 is a schematic structure view of the adjustment structure for depth of field according to another exemplary embodiment.

According to an exemplary embodiment, with reference to FIG. 4, electrodes 21A and 21B are two electrodes of lens unit 310A, and electrodes 21C and 21D are two electrodes of lens unit 310B, and electrodes 21E and 21F are two electrodes of lens unit 310C. The second transparent insulating liquid 30 is filled in a receiving space formed by the two electrodes 21 and an insulating baffle (not shown) in each lens unit 310 respectively. In this way, the lens can be located in the second transparent insulating liquid to realize the use function of each lens unit.

According to an exemplary embodiment, the first transparent insulating liquid 13 has a refractive index greater than that of the second transparent insulating liquid 30. Therefore, it can be ensured that the refractive index inside the lens is greater than the refractive index outside the lens, thereby realizing the use function of a convex lens. According to an exemplary embodiment, the second transparent insulating liquid 30 may be pure water or non-polar oil. Specifically, the second transparent insulating liquid 30 may be silicone oil. In this way, the above liquid can carry the lens without influencing the distribution of the charged particles in the lens, so that the use function of the adjustment structure for depth of field can be better realized.

According to an exemplary embodiment, with reference to FIG. 4, the lens unit 310 further includes a light-shielding layer 40, the light-shielding layer 40 being located on the first substrate 100 and the second substrate 200, and an orthogonal projection of the light-shielding layer 40 on the substrates at least covers an orthogonal projection of the electrodes 21 and the insulating baffles 50A (not shown) and 50B on the substrates. This can prevent the electrodes and the insulating baffles from interfering with the refraction of light rays entering the adjustment structure for depth of field, and thus improve the sensitivity and the accuracy of the focal length adjustment of light rays by the adjustment structure for depth of field. The specific position of the light-shielding layer is not particularly limited as long as the above conditions are satisfied, so those skilled in the art can make a design upon specific situations. For example, according to an exemplary embodiment, the light-shielding layer 40 may be located on a side of the first substrate 100 departing from the lens layer 300 and on a side of the second substrate 200 departing from the lens layer 300 respectively (not shown). Alternatively, the light-shielding layer 40 may also be located on a side of the first substrate 100 close to the lens layer 300 and on a side of the second substrate 200 close to the lens layer 300 respectively (as shown in FIG. 4).

The composition material of the light-shielding layer is not particularly limited as long as it can shield light, so those skilled in the art can make a choice upon specific situations.

According to an exemplary embodiment, with reference to FIG. 3(*b*), the lens 10 will be deformed by the electric field, and the orthogonal projection of the light-shielding layer 40 on the first substrate 100 should also cover the orthogonal projection of the charged particles 12 in the deformed lens 10 on the first substrate 100. This can prevent the charged particles from influencing the refraction of light rays in the lens, and ensure that the incident light rays only enter the first transparent insulating liquid of the lens, and thereby the focal length of the light rays is adjusted.

According to an exemplary embodiment, with reference to FIG. 4, after light rays enter the adjustment structure for depth of field, they will be refracted at different angles in different lens units 310. Since the first transparent insulating liquid 13 has a refractive index greater than that of the second transparent insulating liquid 30, light rays passing through each lens unit 310 are all focused. Moreover, since different lens units 310 have different focal lengths, the distances between the focuses of the light rays passing through different lens units 310 and the second substrate 200 are also different, and thereby depth of field information of the picture can be presented.

Specifically, when a voltage is applied to the two electrodes of the lens unit 310, the charged particles in the lens 10 will be subjected to a force of the electric field such that the distances between the positively charged particles and the negatively charged particles are changed, and thus the shape of the lens 10 (i.e., the curvature of the lens 10) is changed, and accordingly the focal length of the lens 10 is changed. When a beam of light rays is incident on the first substrate 100 in parallel, the light rays enter the lens 10 through the second transparent insulating liquid 30 in the lens unit 310 in parallel, and are then refracted in the deformed lens 10, and finally exit the second substrate 200. In this way, the focal length of the light rays entering the adjustment structure for depth of field can be adjusted to achieve depth of field of the picture.

According to an exemplary embodiment of this disclosure, the lens units 310 correspond to the pixel regions one-to-one. Each pixel region may include one or more pixel points. Light emitted from the pixel region will form an imaging region after passing through the lens unit 310. The imaging points in the imaging region correspond to the pixel points in the pixel region one-to-one, so that the imaging region presents depth of field information of the pixel region corresponding thereto. The presentation of the depth of field information after the light rays of the pixel region are adjusted by the lens unit will be illustrated by taking a pixel region composed of a single pixel point as an example.

According to an exemplary embodiment, with reference to FIG. 4, when a first voltage is applied to the two electrodes of the lens unit 310C, the focus of the light beam after passing through the lens unit 310C is C. When a voltage greater than the first voltage is applied to the two electrodes of the lens unit 310A, the focus of the light beam after passing through the lens unit 310A is A. Since the voltage applied to the lens unit 310A is greater than the voltage applied to the lens unit 310C, the distance between the positively charged particles and the negatively charged particles in the lens 10A is greater than the distance between the positively charged particles and the negatively charged particles in the lens 10C. In other words, the curvature of the lens 10A is smaller than that of the lens 10C such that the distance between the focus A of the light beam after passing through the lens unit 310A and the second substrate 200 is greater than the distance between the focus C of the light beam after passing through the lens unit 310C and the second substrate 200. Similarly, when a voltage smaller than the first voltage is applied to the two electrodes of the lens unit 310B, the focus of the light beam after passing through the lens unit 310B is B. Since the voltage applied to the lens unit 310B is smaller than the voltage applied to the lens unit 310C, the distance between the positively charged particles and the negatively charged particles in the lens 10B is smaller than the distance between the positively charged particles and the negatively charged particles in the lens 10C. In other words, the curvature of the lens 10B is greater than that of the lens 10C such that the distance between the focus B of the light beam after passing through the lens unit 310B and the second substrate 200 is smaller than the distance between the focus C of the light beam after passing through the lens unit 310C and the second substrate 200. In this way, with the adjustment structure for depth of field, the focal length of light rays in multiple pixel regions can be adjusted to achieve depth of field of the picture.

According to an exemplary embodiment, with reference to FIG. 4, the lens layer 300 may further includes a sealant 320, the sealant 320 being arranged around all lens units 310 in the lens layer 300, which can realize tightness of the lens layer and ensure good use performance of the lens units.

Figure 5:
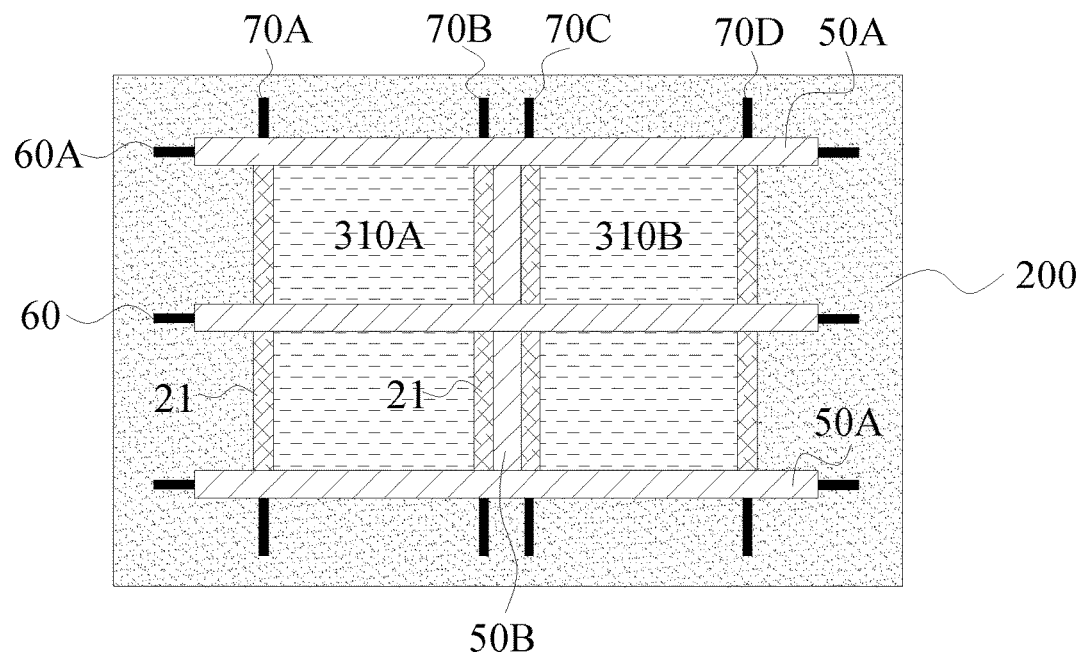
FIG. 5 is a top view of part of the adjustment structure for depth of field according to an exemplary embodiment.

According to an exemplary embodiment, with reference to FIG. 5, the plurality of lens units 310 are arranged in an array, and one of the first substrate 100 and the second substrate 200 is provided with switching lines 60 arranged in rows and data lines 70 arranged in columns, and the electrodes 21 are distributed in a direction in which the data lines 70 extend and are connected with the data lines 70 (as shown in FIG. 4), and the insulating baffles 50A are distributed in a direction in which the switching lines 60 extend. In this way, the voltage applied to the electrodes of the lens unit can be controlled through the switching lines and the data lines, thereby adjusting the focal length of the lens and controlling the adjustment of the focal lengths of multiple lens units separately.

According to an exemplary embodiment, with reference to FIG. 5, insulating baffles 50A are arranged in a direction in which the switching lines 60 extend. Two adjacent rows of lens units 310 may be separated from each other by means of the insulating baffles 50A. Insulating baffles 50B are further arranged in a direction in which the data lines 70 extend and between two adjacent columns of lens units 310 (as shown in FIG. 5 and FIG. 4), so as to separate two adjacent columns of lens units from each other. In this way, a plurality of independent lens units can be formed in the lens layer without interfering with each other.

According to an exemplary embodiment, a switching line 60 is used for controlling the lens units 310 in its row to be switched on and off, and a data line 70 is used for inputting a voltage into the lens units 310 in its column, and each lens unit can be controlled by way of column scanning. According to an exemplary embodiment, the electrodes 21 are connected with the data lines 70 such that the potential of the electrodes is the same as that of the data lines, which facilitates the implementation of the use function of the adjustment structure for depth of field.

According to an exemplary embodiment, when the light-shielding layer 40 is located on a side of the first substrate 100 departing from the lens layer 300 and on a side of the second substrate 200 departing from the lens layer 300 respectively (not shown), the electrodes 21 may be directly arranged on the data lines 70 to achieve electric connection of the electrodes and the data lines. According to further exemplary embodiments, with reference to FIG. 4, when the light-shielding layer 40 is located on a side of the first substrate 100 close to the lens layer 300 and on a side of the second substrate 200 close to the lens layer 300 respectively, the light-shielding layer 40 arranged on the second substrate 200 overlays the data lines 70 on the second substrate 200. The electrodes 21 are located on a side of the light-shielding layer 40 departing from the second substrate 200, and via holes are provided in a region of the light-shielding layer 40 corresponding to the data lines 70, through which the electrodes 21 are connected with the data lines 70 to achieve electric connection of the electrodes and the data lines.

The specific way of controlling the adjustment structure for depth of field according to an exemplary embodiment will be illustrated briefly.

According to an exemplary embodiment, with reference to FIG. 5, the switching lines 60 are scanned in a column by column manner. When the switching lines 60A are energized, a high potential and a low potential are inputted into the data lines 70A and 70B respectively, to thereby control the electric field of the lens unit 310A and thus control the focal length of light rays passing through the lens unit 310A. When the switching lines 60A are energized, a high potential and a low potential are inputted into the data lines 70C and 70D respectively, to thereby control the electric field of the lens unit 310B and thus control the focal length of light rays passing through the lens unit 310B. According to the above steps, the focal lengths of all lens units can be controlled individually, thereby achieving individual adjustment of the focal length of light rays of each pixel point in the display image and thus realizing the depth of field of the picture.

Figure 6:
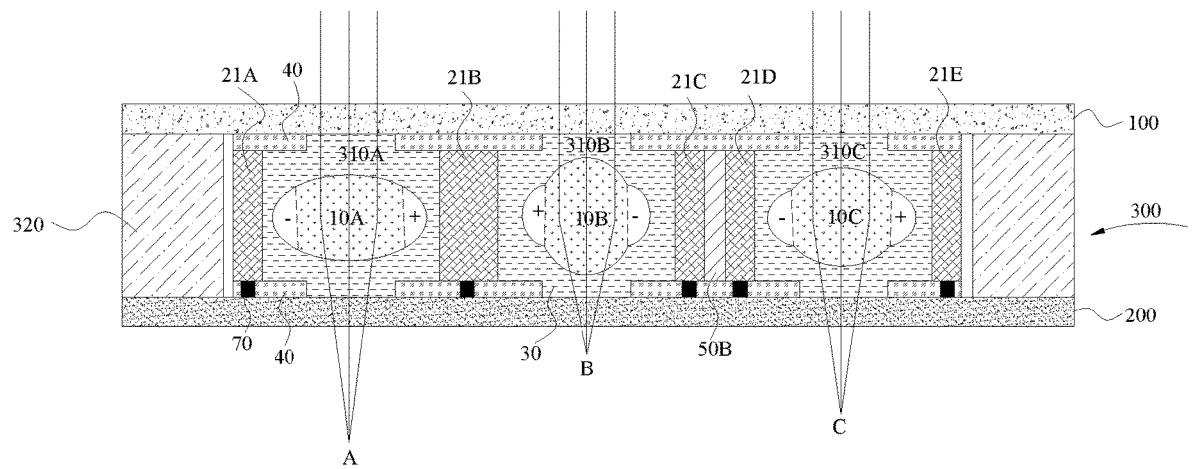
FIG. 6 is a schematic structure view of the adjustment structure for depth of field according to an exemplary embodiment.

According to an exemplary embodiment, with reference to FIG. 6, the lens units 310 are arranged in an array, and two lens units 310 located in a same row and adjacent to each other immediately may have a common electrode. By doing this, the structure of the lens unit can be simplified. Specifically, with reference to FIG. 6, the lens units 310A and 310B may share the electrode 21B. In other words, the electrodes 21A and 21B constitute the two electrodes of the lens unit 310A, and the electrodes 21B and 21C constitute the two electrodes of the lens unit 310B, and the lens unit 310C may have two independent electrodes (electrode 21D and electrode 21E). It should be noted that the lens units 310A and 310B share the electrode 21B, so no insulating baffles are required between the lens units 310A and 310B. The lens units 310B and 310C share no electrode, so insulating baffles 50B are required between the lens units 310B and 310C.

Figure 7:
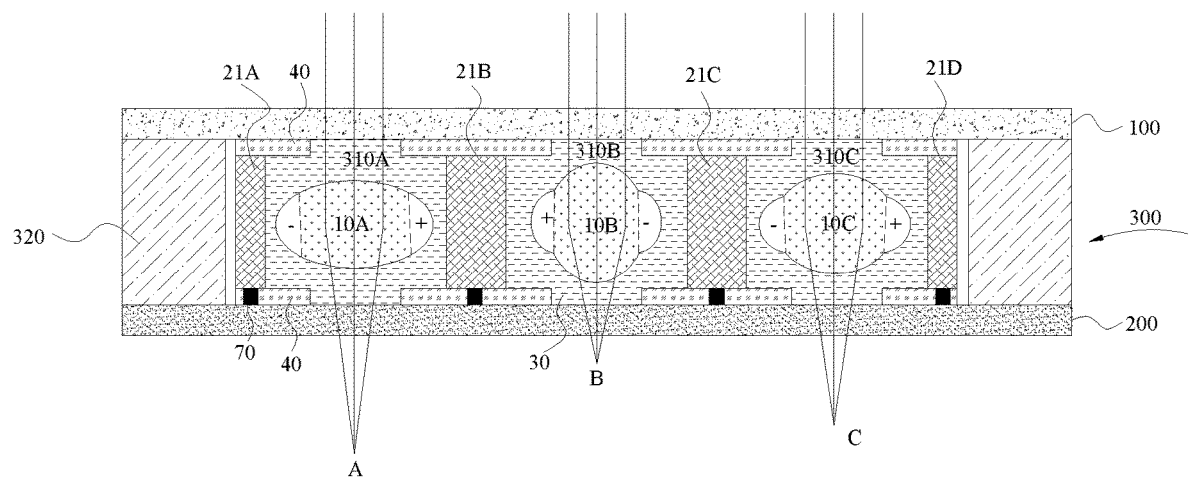
FIG. 7 is a schematic structure view of the adjustment structure for depth of field according to another exemplary embodiment.

Alternatively, with reference to FIG. 7, the lens units 310A and 310B may share the electrode 21B, and meanwhile, the lens units 310B and 310C may share the electrode 21C. In other words, the electrodes 21A and 21B constitute the two electrodes of the lens unit 310A, and the electrodes 21B and 21C constitute the two electrodes of the lens unit 310B, and the electrodes 21C and 21D constitute the two electrodes of the lens unit 310C. The specific sharing of the electrodes is not particularly limited as long as the respective lens units are controlled, which will not be listed exhaustively herein.

The specific way of controlling the adjustment structure for depth of field having shared electrodes according to an exemplary embodiment will be illustrated briefly.

Figure 8:
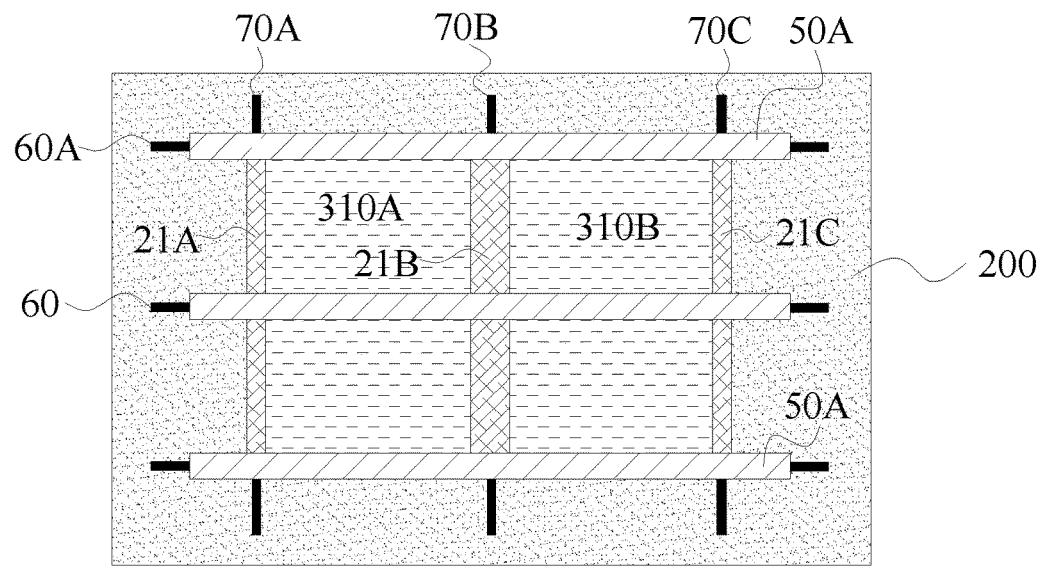
FIG. 8 is a top view of part of the adjustment structure for depth of field according to an exemplary embodiment.

According to an exemplary embodiment, the electrodes are connected with the data lines, i.e., one electrode corresponds to one data line, and when the electrode is shared, the data line corresponding to the electrode is also shared. Specifically, with reference to FIG. 8, when the lens units 310A and 310B share the electrode 21B, the data line 70B connected with the electrode 21B is also shared by the lens units 310A and 310B. When the switching lines 60A are energized, a high potential and a low potential are inputted into the data lines 70A and 70B respectively, to thereby control the electric field of the lens unit 310A. When the switching lines 60A are energized, a high potential is inputted into the data line 70C, and the electric field of the lens unit 310B is controlled by means of the data line 70C at a high potential and the shared data line 70B at a low potential. Therefore, the focal lengths of all lens units can be controlled individually, thereby achieving individual adjustment of the focal length of light rays of each pixel point in the display image and thus realizing the depth of field of the picture while simplifying the structure of the lens units.

Figure 9:
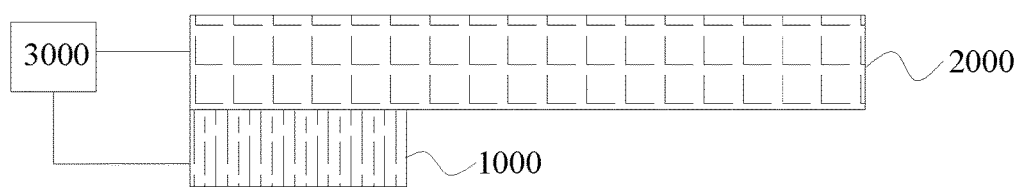
FIG. 9 is a schematic structure view of a display device according to an exemplary embodiment.

According to another exemplary embodiment, with reference to FIG. 9, the display device includes: a display panel 2000, an adjustment structure for depth of field 1000 and a control unit for depth of field 3000. The adjustment structure for depth of field 1000 is located on a light exit side of the display panel 2000. The adjustment structure for depth of field 1000 is the adjustment structure for depth of field described in the above embodiments. The plurality of lens units of the adjustment structure for depth of field 1000 correspond to the plurality of pixel regions in the display panel 2000 one-to-one. The control unit for depth of field 3000 is connected with the display panel 2000 and the adjustment structure for depth of field 1000 respectively.

In the context of the disclosure, the "control unit" in the exemplary embodiments can be realized by a computer (e.g. personal computer) or a combination of a computer and a suitable sensor; the processing of the "control unit" can be realized e.g. by a processor in the computer.

Therefore, the display device has all features and advantages of the adjustment structure for depth of field described above, which will not be to repeated herein for simplicity. The display device can realize the depth of field of a three-dimensional display image such that the user can visually feel a true sense of depth while receiving the distance information of the display picture. Moreover, upon needs of the picture, the adjustment structure for depth of field can be used to adjust the depth of field of each object in the picture in real time so as to enhance the three-dimensional display effect, avoid convergence conflict of the user and prevent dizziness of the user during long-time use.

According to an exemplary embodiment, the control unit for depth of field 3000 is connected with the display panel 2000 and the adjustment structure for depth of field 1000, so the control unit for depth of field can be used for adjusting the voltage applied to the adjustment structure for depth of field, thereby achieving control of the adjustment structure for depth of field.

According to an exemplary embodiment, the plurality of lens units of the adjustment structure for depth of field 1000 correspond to the plurality of pixel regions in the display panel 2000 one-to-one. Each pixel region may include one or more pixel points. Thereby, the focal lengths of light rays of a single pixel point or multiple pixel points can be adjusted individually, so that the depth of field of each object in the picture can be adjusted in real time upon needs of the picture so as to enhance the three-dimensional display effect.

According to an exemplary embodiment, the display device may be a virtual reality display device, or a naked eye stereoscopic display device. In this way, the display device can have good use performances.

The display types of the virtual reality display device are not particularly limited, e.g., according to an exemplary embodiment, the virtual reality display device may be a holographic waveguide three-dimensional display device. Specifically, the virtual reality display device may be a virtual reality head display device, for example, a virtual reality display helmet and glasses. Therefore, a user wearing the head display device can have good senses of reality and immersion, which improves the use experience of the user. According to an exemplary embodiment, the light guide structure in the display device may be a holographic waveguide grating or a light guide plate.

According to an exemplary embodiment, the display device may further include a displacement sensor (not shown), the displacement sensor being connected with the control unit for depth of field 3000. Accordingly, with the displacement sensor and the control unit for depth of field being used in combination, the position change in the imaging region can match with the movement of the user such that the virtual distance between the user and each object in the display picture changes as the position of the user changes, which enhances the user's sense of immersion.

To facilitate the understanding, the control method of the display device according to an exemplary embodiment will be illustrated briefly.

According to an exemplary embodiment, a control method of a display device is provided. The display device includes a display panel, a control unit for depth of field and the adjustment structure for depth of field mentioned above. The adjustment structure for depth of field is located on a light exit side of the display panel, and the plurality of lens units correspond to a plurality of pixel regions of the display panel one-to-one; the control unit for depth of field is connected with the display panel and the adjustment structure for depth of field respectively. The control method includes: adjusting a corresponding adjustment structure for depth of field based on depth of field information of each pixel region.

With the method, the depth of field information of the imaging region adjusted by the lens units is consistent with the depth of field information of the corresponding pixel regions. Therefore, by way of a simple method, the display device can realize the depth of field of a picture such that the user can visually feel a true sense of depth while receiving the distance information of the display picture. Moreover, upon needs of the picture, the adjustment structure for depth of field can be used to adjust the depth of field of each object in the picture in real time so as to enhance the three-dimensional display effect, avoid convergence conflict of the user and prevent dizziness of the user during long-time use.

According to an exemplary embodiment, adjusting the corresponding adjustment structure for depth of field based on depth of field information of each pixel region includes: based on the depth of field information of each pixel region, determining a diopter corresponding to the pixel region; and based on the diopter, determining a voltage applied to the two electrodes of the corresponding adjustment structure for depth of field such that the lens of the corresponding adjustment structure for depth of field is deformed. According to an exemplary embodiment, the pixel region may include one or more pixel points, and the imaging region formed after the adjustment of the lens units include one or more imaging points. Therefore, by using the imaging region, the depth of field information of the pixel region corresponding thereto can be presented.

According to an exemplary embodiment, the step of adjusting the corresponding adjustment structure for depth of field based on depth of field information of each pixel region may include: based on the depth of field information of each pixel region, determining a diopter corresponding to the pixel region; and based on the diopter, determining a voltage applied to the two electrodes of the corresponding adjustment structure for depth of field such that the lens of the corresponding adjustment structure for depth of field is deformed.

Accordingly, the focal length of the adjustment structure for depth of field can be adjusted by way of a simple method. Specifically, firstly, based on the depth of field information of a pixel region in the display picture, a focal length of an lens unit corresponding to the pixel region is determined, and after that, based on the focal length of the lens unit, a curvature of a lens in the lens unit is determined, and then based on the curvature of the lens, a voltage applied to two electrodes in the lens unit is determined, and finally the voltage is applied to the two electrodes to deform the lens such that the lens unit obtains a desired focal length, i.e., a focal length of light rays passing through the lens unit, and the focus of light rays of the pixel region passing through the lens unit constitutes an imaging region corresponding to the pixel region. By adjusting the focal length of the lens unit corresponding to the pixel region based on the depth of field information of the pixel region, the depth of field of the display picture can be finally realized, such that the display device realizes the depth of field of the picture, thereby helping the user obtain senses of reality and immersion and improving the use experience of the user.

According to an exemplary embodiment, during the adjustment of the adjustment structure for depth of field, with the control unit for depth of field, the overall depth of field information of the display picture can be obtained first, and then the overall depth of field information of the display picture is decomposed into the depth of field of each pixel region, and then a voltage to be applied to the lens unit corresponding to each pixel region is analyzed based on the depth of field of each pixel region, and finally the focal length of the lens unit is adjusted by applying the above voltage to the data lines.

According to an exemplary embodiment, with this method, the user can not only obtain a good sense of reality when using the display device at rest, but also obtain a good sense of reality when using it in motion. Specifically, the method includes: adjusting the adjustment structure for depth of field based on displacement information obtained by the displacement sensor such that the distance between the imaging region and the adjustment structure for depth of field matches with the displacement. Therefore, the virtual distance between the user and each object in the display picture changes as the position of the user changes, improving the user's sense of immersion.

According to an exemplary embodiment, when the position of the user changes, the displacement sensor obtains displacement information of the user and feeds the displacement information to the control unit for depth of field which adjusts the adjustment structure for depth of field based on the displacement information such that a change in the focal length of the adjustment structure for depth of field matches with the displacement of the user, i.e., a change in the distance between the imaging region of the lens unit and the adjustment structure for depth of field matches with the displacement of the user. For example, according to a specific embodiment of this disclosure, when the user is at rest, there is a certain virtual distance between the user and a certain object in the virtual display picture. The virtual distance is for example 3 meters. When the user approaches the object in the virtual display picture, through adjustment of the focal length of the adjustment structure for depth of field by the control unit for depth of field, the distance between the imaging region of the adjustment structure for depth of field and the adjustment structure for depth of field is made shorter than it is when the user is at rest. That is, the distance between the display picture and the user is shortened, and the shortened distance between the imaging region and the adjustment structure for depth of field matches with the displacement of the user. If the user approaches the object in the virtual display picture by 1 meter, the shortened distance between the imaging region and the adjustment structure for depth of field can make the virtual distance between the user and the object in the virtual display picture become 2 meters, thereby making the user feel immersed and enhancing the user's sense of immersion.

To facilitate the understanding, the manufacture method of the display device according to an exemplary embodiment will be illustrated briefly.

According to an exemplary embodiment, the method includes: arranging the adjustment structure for depth of field on a light exit side of the display panel. The manufacture method the adjustment structure for depth of field may include the following steps: providing a first substrate and a second substrate, and arranging a lens layer between the first substrate and the second substrate, the lens layer including a plurality of lens units, each lens unit including a lens with an adjustable focal length. Accordingly, the adjustment structure for depth of field can be obtained by way of a simple method.

According to an exemplary embodiment, firstly, switching lines and data lines are printed on the second substrate, the switching lines being arranged in rows and the data lines being arranged in columns. After that, a light-shielding layer is located on the first substrate, and on a side of the second substrate provided with data lines, the light-shielding layer on the second substrate covering the data lines, and via holes are formed by a patterning process in a region of the light-shielding layer of the second substrate corresponding to the data lines, so as to expose the data lines. Then, a metal material or a transparent conductive material is deposited by sputtering on a side of the light-shielding layer of the second substrate departing from the second substrate, and two electrodes are formed by a patterning process, wherein the electrodes are disposed perpendicular to the second substrate and connected with the data lines through the via holes in the light-shielding layer, and the electrodes are arranged in a direction in which the data lines extend, and the sputtering-deposited electrodes may be formed by one sputtering process or by multiple sputtering processes.

Next, insulating baffles are formed in a direction in which the switching lines extend, and between adjacent lens units in a direction in which the data lines extend, so as to separate the lens units, and the process for forming the insulating baffles may be the same as the process for forming the electrodes. Then, a second transparent insulating liquid and a lens are filled in a receiving space formed by the insulating baffles and the two electrodes of each lens unit, thereby forming the lens unit. After that, a sealant is arranged on the second substrate, the sealant being arranged around all lens units to form a lens layer. Finally, the first substrate provided with the light-shielding layer is aligned with the second substrate provided with the lens layer, thereby obtaining an adjustment structure for depth of field.

As for the material and the height of the electrodes as well as the composition of the lens, detailed depictions have been given above, which will not be repeated herein for simplicity.

In the depictions of this disclosure, directional or positional relations indicated by terms such as "up" and "down" are directional or positional relations shown on the basis of the drawings. They are used only for describing this disclosure, instead of requiring that this disclosure be constructed and operated in a specific orientation, so they cannot be construed as limiting this disclosure.

In the depictions of this description, references to terms such as "an embodiment" and "a further embodiment" are intended to mean that specific features, structures, materials or characteristics described with reference to the embodiment are included in at least one embodiment herein. In this description, schematic expressions of the above terms do not necessarily refer to the same embodiment or example. Moreover, specific features, structures, materials or characteristics described thereby can be combined in a suitable manner in any one or more embodiments or examples. Besides, where no contradiction is caused, those skilled in the art may combine and assemble different embodiments or examples described in this description and features of different embodiments or examples. Besides, it should be noted that terms such as "first" and "second" are used only for descriptive purposes and should not be construed as indicating or implying relative importance or hinting at the number of the indicated technical features.

Although the embodiments have been shown and described, it can be understood that the embodiments are exemplary, and they cannot be construed as limiting this disclosure, and one having ordinary skills in the art can vary, change, substitute and modify the above embodiments within the scope of this disclosure.

REFERENCE NUMBERS AND THEIR CORRESPONDING STRUCTURES

100: first substrate; 200: second substrate; 300: lens layer; 310: lens unit; 320: sealant; 10: lens; 11: transparent flexible film; 12: charged particle; 13: first transparent insulating liquid; 21: electrode; 30: second transparent insulating liquid; 40: light-shielding layer; 50A/50B: insulating baffle; 60: switching line; 70: data line; 1000: adjustment structure for depth of field; 2000: display panel; 3000: control unit for depth of field.

What is claimed is:

1. An adjustment structure for depth of field, comprising:
a first substrate, a second substrate and a lens layer located between the first substrate and the second substrate;
wherein the lens layer comprises a plurality of lens units; each of the plurality of lens units comprises two electrodes and a lens located between the two electrodes with an adjustable focal length;
and wherein the lens comprises charged particles and a first transparent insulating liquid encapsulated by a transparent flexible film; the charged particles comprise positively charged particles and negatively charged particles.

2. The adjustment structure for depth of field according to claim 1, wherein the charged particles have a density not greater than that of the first transparent insulating liquid.

3. The adjustment structure for depth of field according to claim 1, wherein each of the two electrodes comprises a surface facing the other electrode, the surface being perpendicular to the first substrate and the second substrate.

4. The adjustment structure for depth of field according to claim 1, wherein each of the two electrodes comprises a surface facing the other electrode, the surface being parallel with the first substrate and the second substrate.

5. The adjustment structure for depth of field according to claim 1, wherein the lens unit further comprises:
an insulating baffle, the insulating baffle being perpendicular to the first substrate and the second substrate, the insulating baffle and the two electrodes defining a receiving space; and
a second transparent insulating liquid, the second transparent insulating liquid being filled in the receiving space, and the lens being located in the second transparent insulating liquid.

6. The adjustment structure for depth of field according to claim 5, wherein the first transparent insulating liquid has a refractive index greater than that of the second transparent insulating liquid.

7. The adjustment structure for depth of field according to claim 5, wherein the lens unit further comprises:
a light-shielding layer, the light-shielding layer being located on the first substrate and the second substrate, an orthogonal projection of the light-shielding layer on the substrates at least covering an orthogonal projection of the electrodes and the insulating baffle on the substrates.

8. The adjustment structure for depth of field according to claim 1, wherein the plurality of lens units are arranged in an array, and two of the lens units immediately adjacent to each other share an electrode.

9. The adjustment structure for depth of field according to claim 5, wherein the plurality of lens units are arranged in an array; one of the first substrate and the second substrate is provided with switching lines arranged in rows and data lines arranged in columns; the electrodes are distributed in a direction in which the data lines extend and are connected with the data lines, and the insulating baffles are distributed in a direction in which the switching lines extend.

10. The adjustment structure for depth of field according to claim 7, wherein the lens is configured to be deformable in an electric field, and an orthogonal projection of the light-shielding layer on the first substrate covers an orthogonal projection of the charged particles on the first substrate.

11. The adjustment structure for depth of field according to claim 1, wherein the charged particles have a dimension of 0.05-40 μm, and the charge particles comprise at least one of electrophoretic particle and electronic ink.

12. A display device comprising a display panel, a control unit for depth of field and the adjustment structure for depth of field according to claim 1;
wherein the adjustment structure for depth of field is located on a light exit side of the display panel, and the plurality of lens units correspond to a plurality of pixel regions of the display panel one-to-one; the control unit for depth of field is connected with the display panel and the adjustment structure for depth of field respectively.

13. The display device according to claim 12, further comprising: a displacement sensor, the displacement sensor being connected with the control unit for depth of field.

14. The display device according to claim 12, wherein the charged particles have a density not greater than that of the first transparent insulating liquid.

15. The display device according to claim 12, wherein each of the two electrodes comprises a surface facing the other electrode, the surface being perpendicular to the first substrate and the second substrate.

16. The display device according to claim 12, wherein each of the two electrodes comprises a surface facing the other electrode, the surface being parallel with the first substrate and the second substrate.

17. The display device according to claim 12, wherein the lens unit further comprises:
an insulating baffle, the insulating baffle being perpendicular to the first substrate and the second substrate, the insulating baffle and the two electrodes defining a receiving space; and a second transparent insulating liquid, the second transparent insulating liquid being filled in the receiving space, and the lens being located in the second transparent insulating liquid.

18. The display device according to claim 17, wherein the first transparent insulating liquid has a refractive index greater than that of the second transparent insulating liquid.

19. A control method of a display device, wherein the display device comprises a display panel, a control unit for depth of field and the adjustment structure for depth of field according to claim 1;
wherein the adjustment structure for depth of field is located on a light exit side of the display panel, and the plurality of lens units correspond to a plurality of pixel regions of the display panel one-to-one; the control unit for depth of field is connected with the display panel and the adjustment structure for depth of field respectively;
wherein the control method comprises: adjusting a corresponding adjustment structure for depth of field based on depth of field information of each pixel region.

20. The method according to claim 19, wherein adjusting the corresponding adjustment structure for depth of field based on depth of field information of each pixel region comprises:
based on the depth of field information of each pixel region, determining a diopter corresponding to the pixel region; and
based on the diopter, determining a voltage applied to the two electrodes of the corresponding adjustment structure for depth of field such that the lens of the corresponding adjustment structure for depth of field is deformed.

* * * * *